May 15, 1934. K. M. HAINSWORTH 1,958,427
AUTOMATIC TRANSMISSION AND CLUTCH CONTROL
Filed Nov. 14, 1932 6 Sheets-Sheet 3
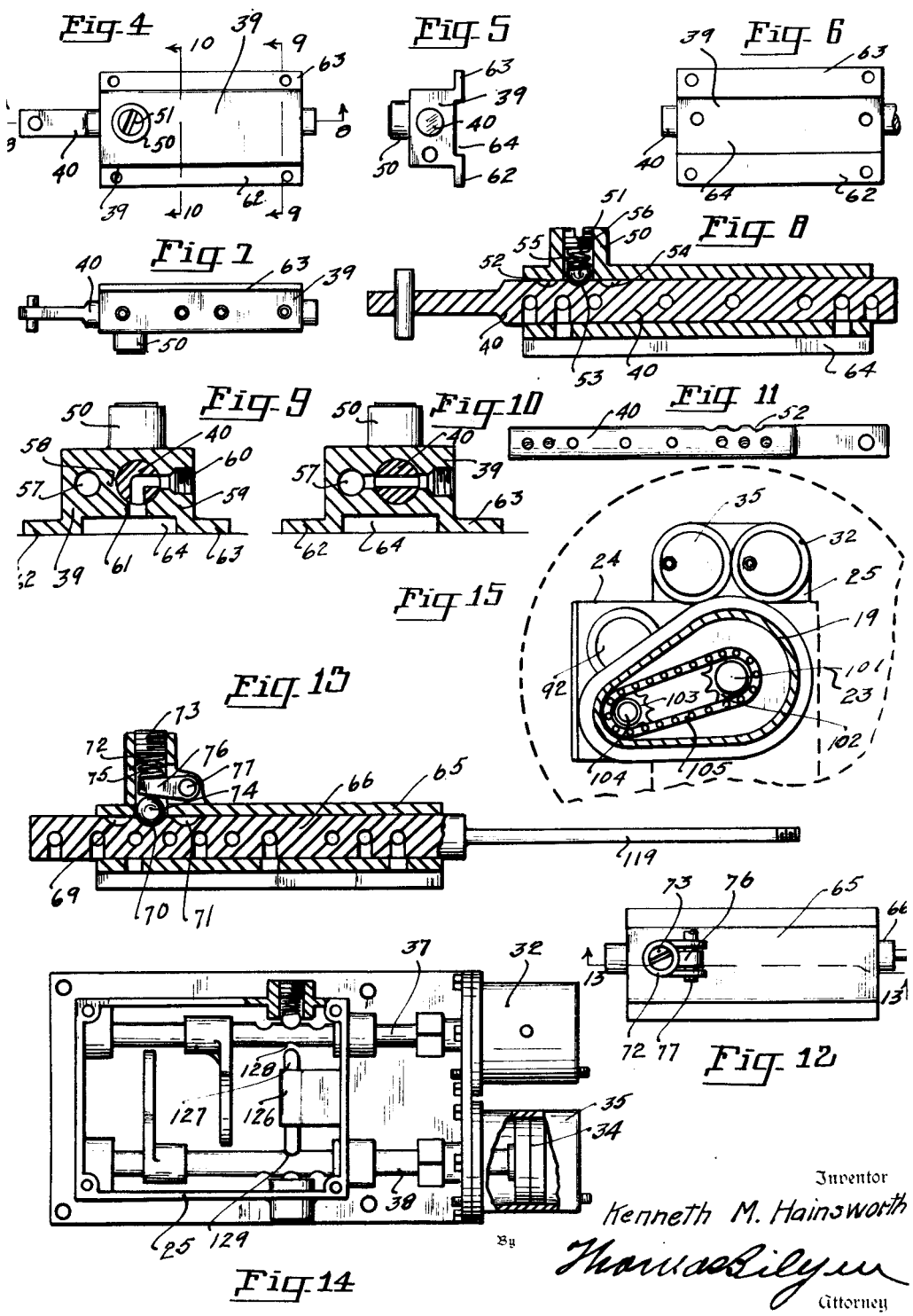

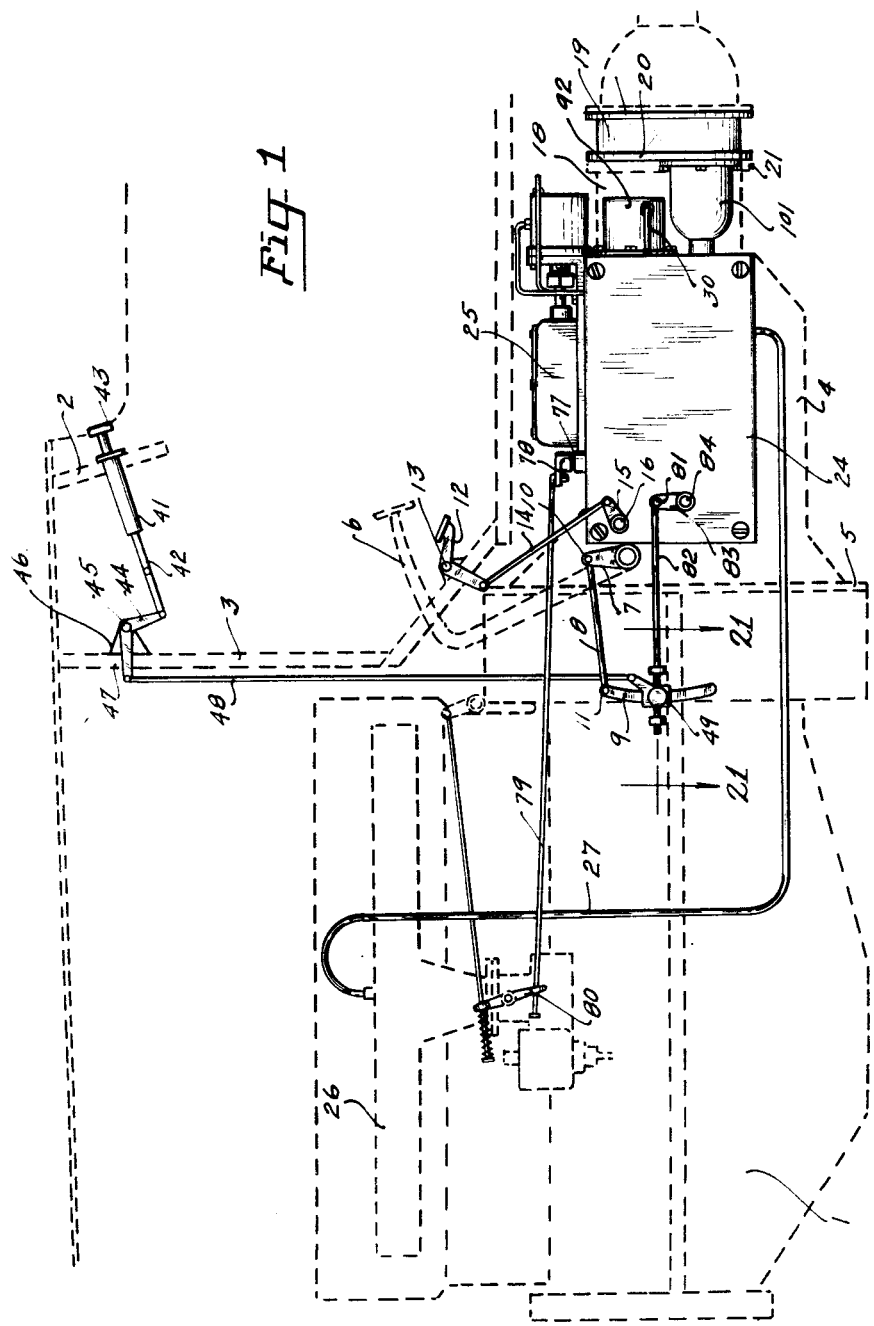
May 15, 1934. K. M. HAINSWORTH 1,958,427
AUTOMATIC TRANSMISSION AND CLUTCH CONTROL
Filed Nov. 14, 1932 6 Sheets-Sheet 1
Inventor
Kenneth M. Hainsworth

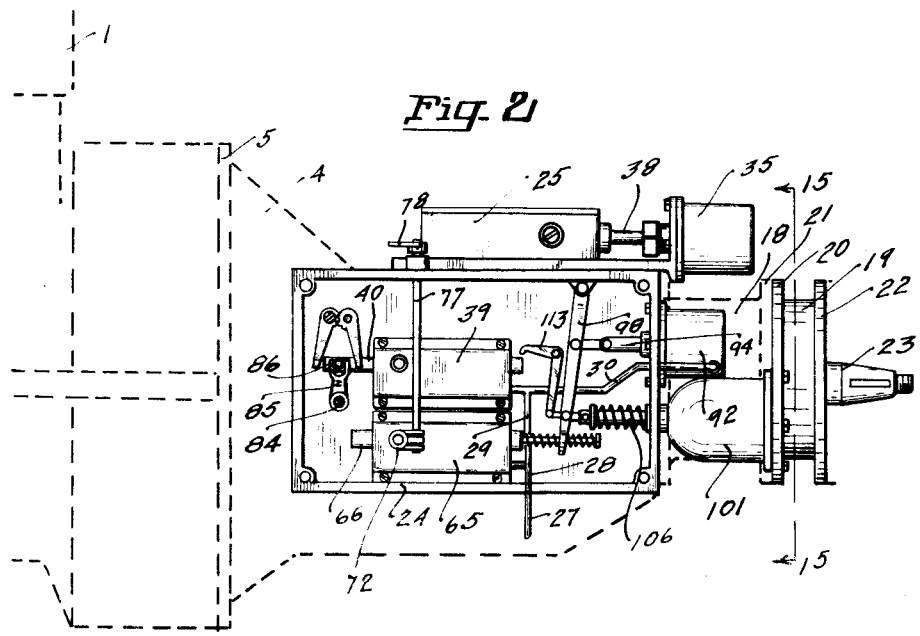
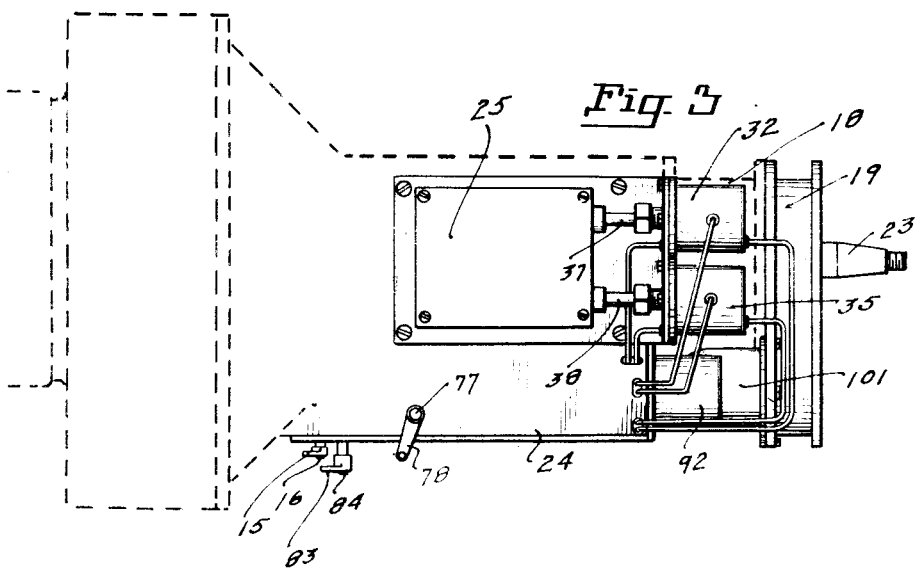

May 15, 1934.  K. M. HAINSWORTH  1,958,427
AUTOMATIC TRANSMISSION AND CLUTCH CONTROL
Filed Nov. 14, 1932  6 Sheets-Sheet 4
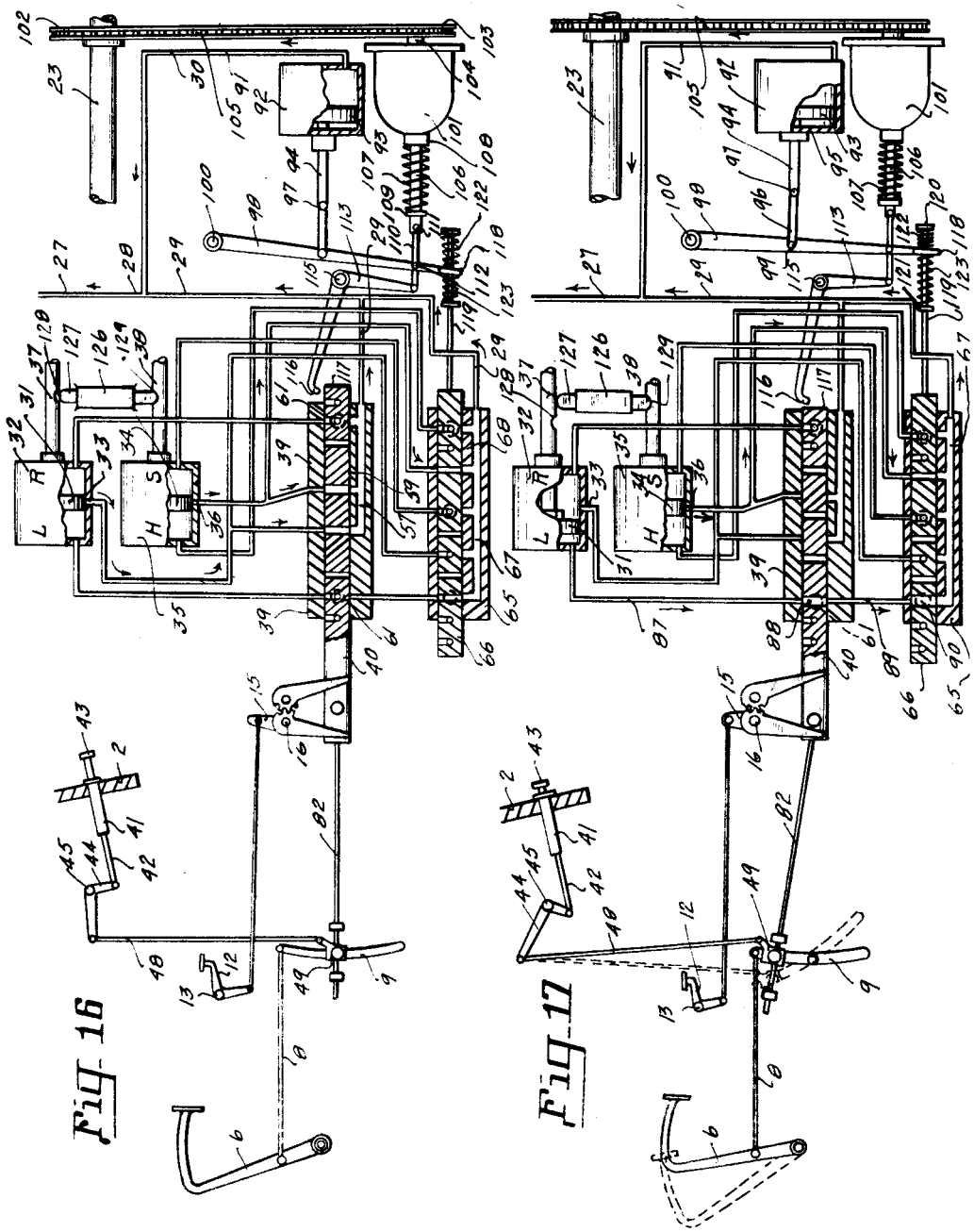
Inventor
Kenneth M. Hainsworth
By Thomas Bilyeu
Attorney

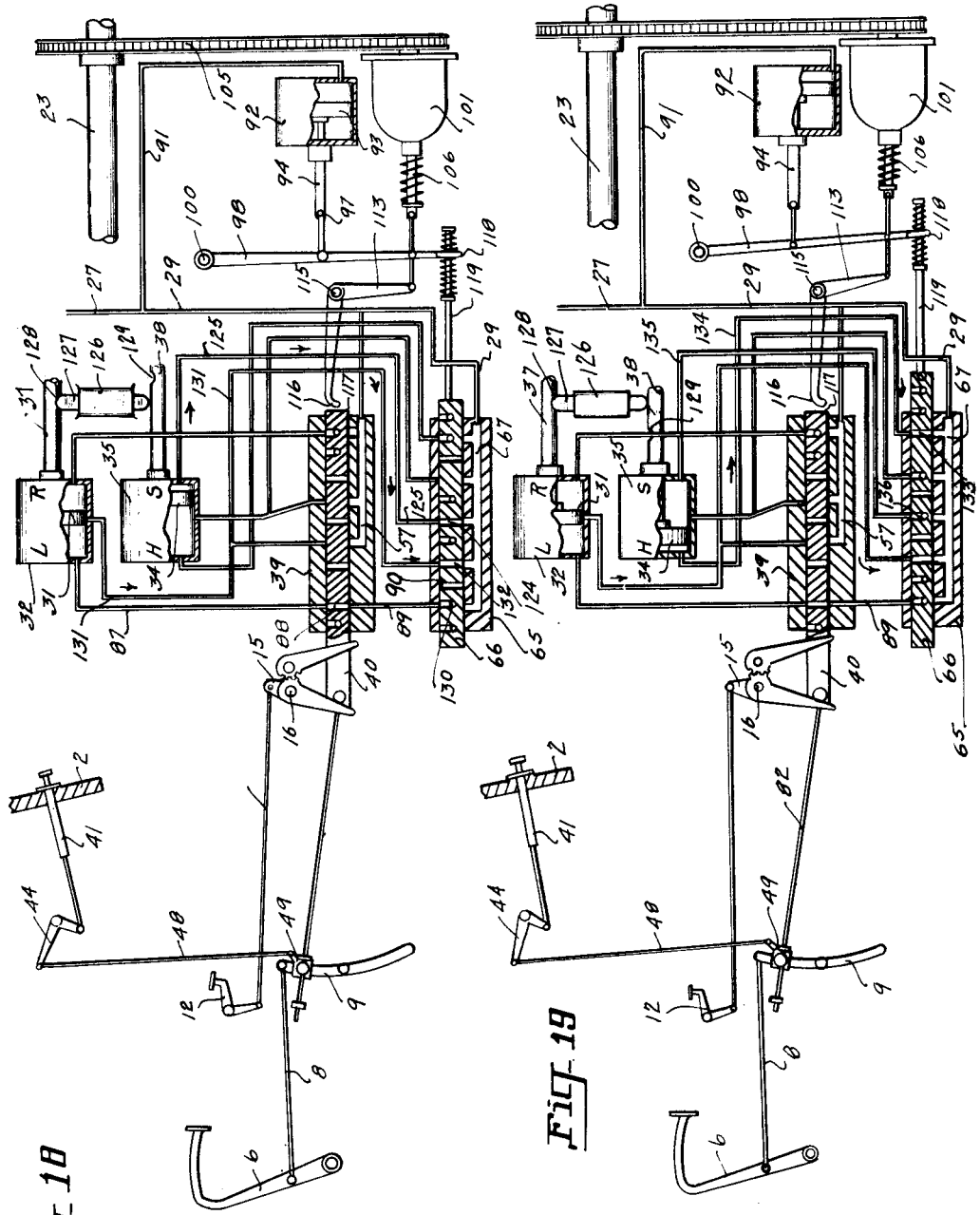

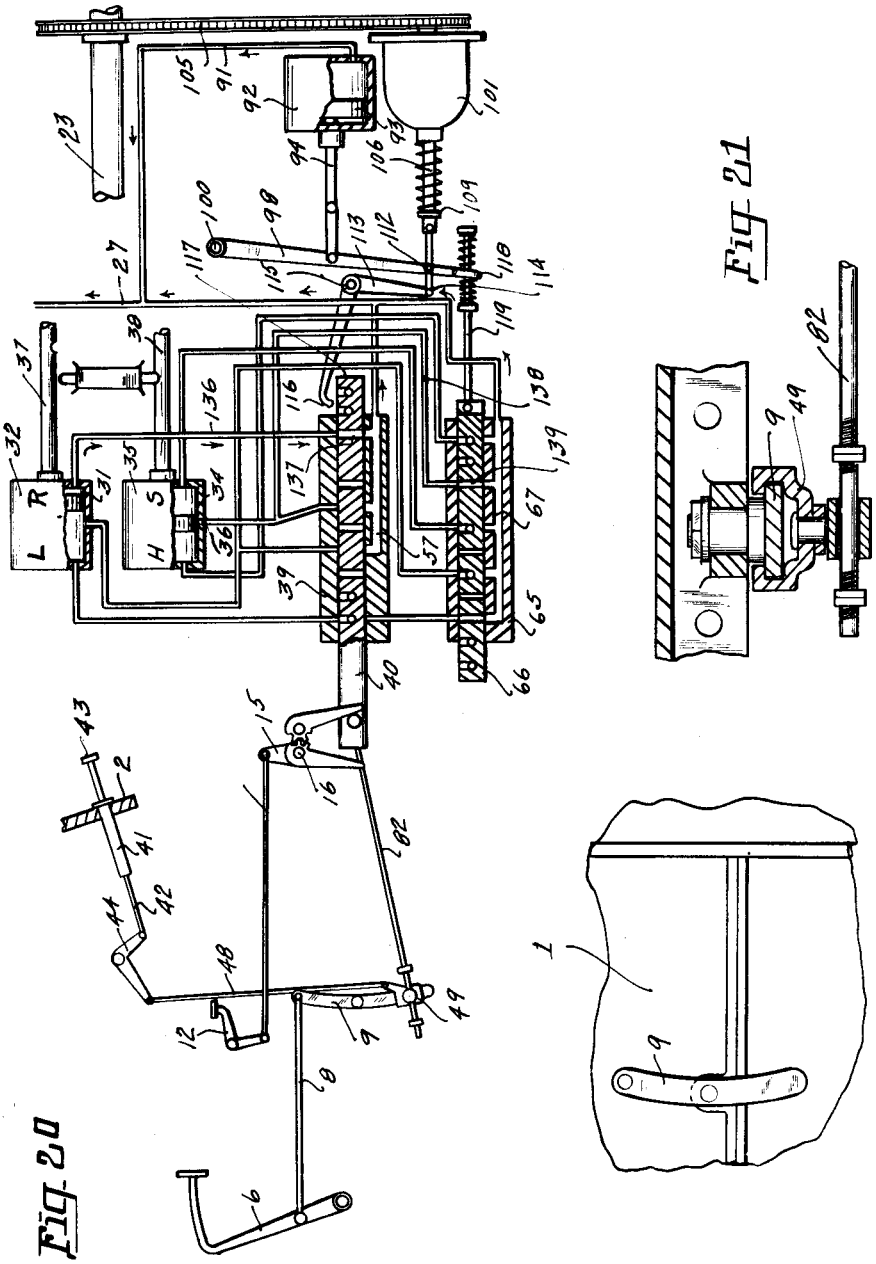

Patented May 15, 1934

1,958,427

UNITED STATES PATENT OFFICE 1,958,427

AUTOMATIC TRANSMISSION AND CLUTCH CONTROL

Kenneth M. Hainsworth, Portland, Oreg., assignor, by direct and mesne assignments, of one-fourth to Thomas A. Moler, and three-fourths to Welker W. Hudgings, both of Portland, Oreg.

Application November 14, 1932, Serial No. 642,522

15 Claims. (Cl. 74—97)

The invention is comprised primarily of improvements in selective transmissions that are adapted for being manually manipulated for the placing of the transmission gears into low starting forward drive and for being manually manipulated for being placed in reverse drive and for automatically changing the gear ratios thereafter for accelerating, or decelerating the vehicle depending upon the labor or the vacuum created by the internal combustion engine that is used for the prime mover and a mechanical governor that are jointly used for automatically shifting the gears when for any reason the speed of the vehicle is stepped up, or down, or the vacuum created by the engine drops down.

I accomplish this through the use of valves, cylinders, pistons, piston rods, that are connected with and adapted for operating the valve through the suction head developed by the internal combustion engine and through the movement of a mechanical governor that is adapted for being operated through the speed of the motor vehicle itself. Manually manipulative means are provided for placing the gears of the transmission in a neutral, or in a low gear forward driving position and in a reverse gear driving position and for thereafter being automatically shifted as the occasion requires, the shifting is dependent upon the speed of the vehicle and the labor of the engine.

One of the objects of my invention consists in providing automatic means for the shifting of the gears in the transmission case of an automotive vehicle in order that the automatic selection of the gears will be determinable directly upon the labor being performed by the internal combustion engine that is used as the prime mover for driving the automotive vehicle and a mechanical governor.

A still further object of my invention consists in providing automatic means that are adapted for being manually started in its cycles of operation in conjunction with the clutch to place the transmission in a forward or reverse driving position and thereafter to shift the transmission gears into a higher or lower gear driving ratio depending upon the labor of the engine and the speed of the vehicle.

And a still further object of my invention consists in providing manually selective means that will operate automatically after the direction of movement of the vehicle is manually selected. The automatic means will shift all transmission gears into the most economical gear ratios that are automatically determinable through vacuum created within the suction line, or the labor of the engine, and/or the speed of the motor vehicle. The rate of rotation of the drive shaft of the vehicle operates a mechanical governor that coacts with a pair of valves to automatically shift the driving gears disposed in the transmission case.

And a still further object of my invention consists in providing a device through the automatic governing of which the gears of the transmission will automatically remain in high transmission gear and will coast in high gear if the vehicle is propelled at a predetermined high speed, even though the fuel supply is shut off until a drop in vehicle speed occurs to where the governing device will automatically place the transmission gears into the next lower driving position.

A still further object of my invention consists in providing a transmission that is adapted for being actuated automatically in all speed driving positions excepting in reverse driving position.

And a still further object of my invention consists in so arranging my device, in combination with a governor that the device may be automatically governed and thereby effect operating fuel economies not heretofore obtained.

And a still further object of my invention consists in so constructing the device, in combination with a free wheeling transmission that beginners and the aged may manipulate the motor vehicle, with less effort and in perfect safety.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a fragmentary, sectional side view of the front end of the motor vehicle and a side view of my new and improved device shown as being applied to the transmission hook-up and controls of the motor vehicle.

Fig. 2 is a fragmentary, side view of the transmission case of the motor vehicle and a partial sectional side view of my assembled device, shown as being attached to the transmission case. In this view I have not shown the piping connections associated with my assembly in order to eliminate the complication instant to such hook-up.

Fig. 3 is a top, plan view of the transmission case and a top, plan view of my new and improved device shown attached thereto.

Fig. 4 is a top, plan view of one of the valves shown removed from the completed assembly.

Fig. 5 is an end view of the valve illustrated in Fig. 4.

Fig. 6 is an inverted plan view of the valve illustrated in Figs. 4 and 5.

Fig. 7 is a side view of the device illustrated in Figs. 4 to 6 inclusive. This view illustrates the valve assembly shown in Fig. 4, as being in inverted position.

Fig. 8 is a sectional side view of the valve assembly shown in Figs. 4 to 7 inclusive. This view is taken on line 8—8 of Fig. 4, looking in the direction indicated.

Fig. 9 is a sectional end view of the valve assembly illustrated in Fig. 4. This view is taken on line 9—9 of Fig. 4, looking in the direction indicated.

Fig. 10 is a sectional, end view of the mechanism illustrated in Fig. 4. This view is taken on line 10—10 of Fig. 4, looking in the direction indicated.

Fig. 11 is a side view of the cylindrical slide valve adapted to the valve assembly illustrated in Figs. 4 to 10 inclusive. In this view the slide valve is shown removed from the valve assembly.

Fig. 12 is a plan view of the valve assembly that is used in shifting the gears disposed within the transmission case from low to medium, and from medium to high, and/or high to medium, and/or from medium to low, in either direction automatically for these gear changes.

Fig. 13 is a sectional, side view of the valve illustrated in Fig. 12.

Fig. 14 is a plan view, partially in section of the cylinder and piston assembly that are adapted to the cover plate of the transmission housing, and illustrates the piston rods adapted for being manipulated by the pistons and illustrating the actuating yokes associated therewith and adapted to the transmission and for the automatic shifting of the gears and adapted for actuating all of the gear shifts automatically that are required to be made in the driving of an automobile in either direction and at the required speeds, excepting in reverse.

Fig. 15 is a fragmentary, sectional, end view of the mechanism illustrated in Fig. 2. This view is taken on line 15—15 of Fig. 2, looking in the direction indicated. This view is made to illustrate the drive take-off of the power shaft of the transmission that is used for manipulating the valve controlling the selective speed of the gears that is automatically to be made and that is dependent upon the speed of the car for the selection to be made.

Fig. 16 is a diagrammatical layout assembly of the two valves, the cylinders, and pistons and piston rods and of the automatic control governor; the pistons being adapted for actuation by the vacuum line of the automotive vehicle, and illustrating the direction of flow of the operating fluid disposed within the piping connections that lead from the cylinders to the valves and a source of supply of the operating fluid. In this view is also shown the clutch hook-up and manually manipulative valve assembly. In the position of the device here shown the assembly is shown in neutral driving position.

Fig. 17 is a diagrammatical layout of the same mechanism illustrated in Fig. 16, but illustrating the device as having been manually placed initially in the forward low gear driving position.

Fig. 18 is a diagrammatical layout of the mechanism illustrated in Figs. 16 and 17 inclusive, but illustrating the valve and piston assembly as having been automatically progressed to second gear for driving in a forward direction.

Fig. 19 is a diagrammatical layout of the mechanism illustrated in Figs. 16 to 18 inclusive, excepting in this position the device has been automatically progressed to high gear driving position.

Fig. 20 is a diagrammatical layout of the mechanism illustrated in Figs. 16 to 19 inclusive, excepting in this position the manual selection for reverse driving has been made, and in this position is also shown the drive from the power shaft of the vehicle to the automatic governor.

Fig. 21 is a fragmentary, sectional, plan view, of the manual control assembly associated with the actuator rod that permits the manual manipulation of the gear shift of the transmission and for manually placing the gear in low position for forward drive and in reverse position for reverse drive. This view is taken on line 21—21 of Fig. 1, looking in the direction indicated.

Fig. 22 is a side view, of the rocker arm assembly that is secured to any suitable support, as the crank case of the engine. The rocker arm is adapted for being manually positioned and for being operated by the clutch lever assembly.

Like reference characters refer to like parts throughout the several views.

In Fig. 1, I have illustrated my device as being adapted to an automotive vehicle, in which the engine assembly is illustrated at 1. The cowl of the vehicle is illustrated at 2, and the dash of the vehicle is illustrated at 3. A transmission 4 is adapted to and secured to the engine frame in the usual manner by the flange connections 5.

The clutch, not here shown, is adapted for being manipulated through the foot clutch lever 6. An arm 7 upwardly extends from the hub of the foot lever 6 and a link 8 connects the arm 7 with a rocker arm 9. The link is connected to the arm 7 by any suitable hinging connection illustrated at 10, and the link is connected to the rocker arm 9 by any suitable hinging connection 11.

In my new and improved assembly I provide a bell crank 12 that is adapted for being manually manipulated through the foot of the operator. The bell crank is hingedly disposed about a supporting pin 13 and a link 14 connects the bell crank with an arm 15. The arm 15 is secured to a shaft 16 that adapts my device for being manually manipulated and for placing a valve in neutral driving position.

My device is particularly adapted for placement upon automotive vehicles in which a free wheeling unit is disposed within the housing 18. I provide a housing 19 at the end of the free wheeling housing 18 and secure the same thereto by adapting the flange 20 of the housing to the flange 21 of the free wheeling housing unit. A flange 22 is provided at the end of the housing 19, to facilitate attaching the device to any suitable driving shaft connection and for journaling the driven power shaft 23. I also provide a housing 24 disposed at one side of the transmission case for the placing of valves therein. The valves are adapted for being operated by any suitable fluid pressure means as the suction, or vacuum created in the intake manifold of the automotive engine.

I also provide a housing 25 that is preferably placed at the top of the transmission housing and in which the controls are disposed and that are adapted for being automatically manipulated.

In Fig. 1, the inlet manifold of the engine is illustrated at 26 and a pipe 27 leads from the inlet manifold to the housing. Suitable piping connections 29 and 30 lead from the end 28 of the pipe 27 and connect the valve housings and the cylinders, as hereinafter to be described.

In the initial starting of the vehicle I am assuming for the purpose of this description that the transmission gears are in neutral position, as illustrated in diagrammatical layout in Fig. 16. During the neutral period, the piston 31, that is disposed within the cylinder 32 is shown in neutral position and over the port 33 that is disposed within the cylinder 32, also the piston 34 disposed within the cylinder 35 is in neutral position and the piston 34 is over and closes the port 36 disposed within the cylinder wall. The piston disposed within the cylinder 32 is adapted for placing the gears in the transmission in low and reverse position, and the piston disposed within the cylinder 35 is adapted for placing the gears in the transmission case in second and high position, or in high and second driving position.

The piston rod 37 is adapted for being manipulated by the piston 31 and a piston rod 38 is adapted for being manipulated by the piston 34.

A valve 39 has a cylindrical opening extending longitudinally thereof and a cylindrical slide valve 40 is adapted for being moved longitudinally of the valve body. The slide valve 40 is adapted for being manually manipulated to place the transmission gears in low forward driving position and for placing the transmission gears in reverse driving position, and for being manually manipulated. This slide valve is also adapted for being manually manipulated to place the same in neutral position and in which neutral position this slide valve is illustrated in diagrammatical layout in Fig. 16.

This manually manipulative hook-up is illustrated in Fig. 1. A sleeve 41 is adapted to the cowl 2 and a link 42 is adapted for being manually manipulated and for being moved longitudinally of the sleeve 41. The link 42 terminates in a pull knob 43, that is disposed upon its outer free end. A reacting element, not here shown, is disposed within the sleeve 41 and it is adapted for fixedly maintaining the link in placed position until manually manipulated. The link 42 illustrated in Fig. 1 and in Fig. 16 is shown in neutral position.

A bell crank 44 is hingedly disposed relative to the dash 3 by being hingedly disposed about a supporting pin 45. The supporting pin 45 is disposed within the bracket 46. A slot 47 is disposed through the dash 3, and one end of the bell crank 44 extends through the opening 47 and a link 48 connects the bell crank 44 with a cross head 49. The cross head 49 is adapted for being moved along the rocker arm 9, and for positioning the cross head relative to the rocker arm. When in the position, as illustrated in Fig. 1, the cross head is in neutral position. The body of the valve and the slide valve associated therewith, that is adapted for being manually manipulated, is illustrated in detail, in Figs. 4 to 11 inclusive. This valve, as shown in cross section in Fig. 8 is shown in neutral position.

A boss 50 upwardly extends from the valve body and an adjustable seat 51 is threadably adapted to the boss. The slide valve 40 has a plurality of recesses, here shown as three in number at 52, 53 and 54, are placed upon the outer surface of the slide valve and into which a stop ball 55 is adapted for being placed and for being seated therein. The seating pressure of the ball within the recesses is determinable by a reacting element, as a coil spring 56, the pressure of which may be determined by the adjusting seat 51 that is threadably adapted to the boss 50. In this position the ball 55 is shown within the seat 53, which is neutral position for the slide valve.

A plurality of ports are disposed transversely of the slide valve and the same are adapted for being placed into and out of registry with a like number of ports that are disposed within the valve body. A chest 57 runs longitudinally of the valve body 39, and ports pass through the diaphragm 58 that is disposed between the vacuum chest 57, and the slide valve having ports disposed transversely thereof that extend longitudinally of the valve body.

A plurality of ports extend through the side wall 59 of the valve body. The walls of the ports are threaded, as illustrated at 60 to adapt suitable pipe connections thereto that lead to the respective operating cylinders hereinafter to be described.

A plurality of exhaust ports extend through the side walls 61 of the valve body. These ports exhaust the valve to the atmosphere. Flanges 62 and 63 outwardly extend from either side of the valve body to adapt the same for being supported upon the transmission housing, and an exhaust chest 64 runs transversely of the base of the valve body to relieve the building up of the exhaust pressure within the base of the valve.

An automatically controlled valve body 65 is disposed adjacent the valve body 39, and which may, or may not be made integral therewith and a slide valve 66 is adapted for being automatically moved longitudinally of the valve body 65. A vacuum chest 67 is disposed transversely of the valve body 65 and a diaphragm 68 is disposed between the vacuum chest 67 and the valve 66.

A plurality of ports are disposed between the vacuum chest 67 and the interior of the valve through which the slide valve 66 is adapted for being automatically moved. A plurality of ports are disposed transversely of the slide valve 66 and are adapted for being placed into and out of registry with the ports disposed within the diaphragm 68 and, or the ports disposed through the oppositely disposed side wall of the valve body 65.

A plurality of recesses, here shown as three in number at 69, 70 and 71 are disposed in spaced relationship upon the outer surface of the slide valve 66. A boss 72 upwardly extends from the valve body and an adjustable head 73 is threadedly secured to the upwardly extending boss. A ball 74 is adapted for being seated within the respective recesses 69, 70 and 71 and a reacting element, as a coil spring 75, is seated upon its one end upon the adjustable head 73 and upon its oppositely disposed end for resting directly upon an arm 76. The arm 76 is disposed between the coil spring and the ball 74. In the automatic shifting of the slide valve 66, the shaft 77 is partially rotated and in the partial rotating of the shaft 77 an arm 78, as illustrated in Fig. 1, is partially rotated. A link 79 connects the arm 78 with the diaphragm actuating arm 80 of the carburetor and during the period of the automatic shifting of the gears the engine is prevented from temporarily racing by this throttling control during the period that the transmission gears are being automatically shifted.

During the period that the transmission gears are in neutral position and the engine is running the pistons disposed within the cylinders 32 and 35 are placed over the ports so that no vacuum will be created within the cylinders.

The cross head 49 is illustrated in neutral position in Fig. 1, and the manually manipulative valve 40, is illustrated in neutral position in Fig. 16. In the placing of the motor vehicle in position for being propelled forward in low gear the knob 43, is pushed away from the operator and toward the dash and in doing so the cross head 49 is raised relative to the rocker arm 9. The rocker arm 9 forms the segment of a circle, the radius of which would connect the center line 81, of the journal pin that connects the link 82 with the cross head 49 and with the arm 83. The arm 83 is secured to a horizontally disposed shaft 84 that extends through the side walls of the transmission case and is journaled relative thereto.

A bifurcated arm 85 is also disposed upon the shaft 84 and the bifurcated end of the arm 85 coacts with a pin 86 that outwardly extends to the side wall of the manually operated cylindrical slide valve 40. The operating of the clutch lever 6 when the cross head is in the position as now described rocks the rocker arm 9 and automatically places the valve 40 in the position, as illustrated in Fig. 17. When placed in this position the vacuum suction is permitted to enter the cylinder 32 through a suitable piping connection 87. This places the port 88 in registry with the pipe 87 and in registry with a pipe 89, that leads from the valve 39 to the valve 65. This also permits the vacuum suction to flow through the port 90 disposed within the cylindrical slide valve 66 and permits the vacuum suction to enter the vacuum chest 67 disposed within the valve 65 and outwardly flows through the pipe 29 then to the pipe 27 that leads to the manifold of the internal combustion engine.

A pipe 91 connects the pipe 27 with a cylinder 92. The cylinder 92 has a piston 93 reciprocably disposed within the cylinder 92 and a piston rod 94 passes through the cylinder head 95 and connects with the piston 93 and is actuated thereby. A link 96 is adapted to the piston rod 94 on its one end by a connecting pin 97. The oppositely disposed end of the rod 96 is connected to the valve shifter arm 98, by a connecting pin 99. The arm 98 is hingedly journaled about a journal shaft 100, upon its one end.

A mechanically operated governor 101 is adapted for being driven from the driven power shaft 23.

I place a sprocket 102 upon the shaft 23 and I place a sprocket 103 upon the shaft 104 of the mechanical governor and I train a driving chain 105 about the respective sprockets 102 and 103 so that the mechanical governor is directly driven and is directly controlled by the speed of the driven power shaft which is in itself a reflection of the speed of the vehicle, since the driven power shaft 23 is rotated at all times and the speed of which is directly controllable by the rotation of the driving wheels of the motor vehicle.

I do not wish to be limited to any particular type, or form of mechanical governor, but I have found satisfactory results may be obtained through the use of a wobble type governor. The shaft 106 of the governor outwardly extends from the governor and extends through the end of the governor housing and the movement of the shaft 106 is somewhat regulated through the action of a compressible element, as a coil spring 107, that is disposed about the shaft 106. One end of the reacting element 107 rests against the collar 108 that is formed integral with the housing of the mechanical governor. The oppositely disposed end of the reacting element 107 reacts against a collar 109 that is disposed directly upon the shaft 106 of the mechanical governor.

A link 110 is secured upon its one end to a connecting pin 111 and directly connects the link with the shaft 106 of the mechanical governor. The link 110 is directly secured to the valve shifter arm 98 through the action of a connecting pin 112 and as the mechanical governor shaft has longitudinal movement imparted thereto the valve shifter arm 98 will also be moved. The link 110 is also directly secured to a bell crank 113. The same is secured thereto by a connecting pin 114. The bell crank 113 is rockably disposed about a suitable shaft 115 and the free end 116 of the bell crank is adapted for being placed into and out of registry with the end 117 of the mechanically operated valve 40.

The function of the bell crank 113 is an important one.

The manually operated valve 40 is illustrated in reverse position in Fig. 20 and when the valve 40 is in this position the free end 116 of the bell crank is raised above the manually operated valve 40 and the mechanical governor is then prevented from shifting the bell crank 113 and the valve shifting arm 98. When the manually operated valve 40 is placed in the position, as illustrated in Fig. 17, the free end 116 of the bell crank is dropped below the end 117 of the manually operated valve 40 and prevents the operator of the vehicle from manually placing the manually operated valve 40 into reverse position. Excepting in these two positions the mechanically operated governor is free to manipulate the bell crank and the valve shifter arm 98. The valve shifter arm 98 is bifurcated, as illustrated at 118 upon its free end and the valve stem 119 outwardly extends from the automatically operated slide valve 66 and passes between the bifurcated end 118 of the arm 98.

To form a flexible connection between the arm and the valve stem, I place collars 120 and 121 upon the valve stem and I place reacting compressible elements 122 and 123 between the respective collars and the free bifurcated end 118 of the valve shifter arm 98.

Referring to Fig. 17, the manually manipulative valve 40 is in locked position through the action of the bell crank 113 and the mechanically operated governor has placed the reacting elements 122 and 123 in an unbalanced relationship with an unbalanced tension having been placed upon the reacting element 122.

The mechanically operated governor 101 is so designed that it will not shift the automatic valve 66 unaided against the locking ball 74 and against the reacting element 107 that is disposed upon the shaft 106 of the mechanical governor, and therefore the mechanical governor and the piston 93 are adapted for coacting together and for simultaneously shifting the valve shifter arm 98, when sufficient vacuum has been developed within the cylinder 92, to make this possible. The speed of the vehicle, or the speed of the rotation of the drive shaft of the vehicle is the controlling factor in the driving and operating of the mechanical governor 101 and the labor of the engine is the controlling factor in the development of vacuum within the intake manifold of the internal combustion engine.

In the event that an increase in speed of the vehicle operates the mechanical governor to urge the arm 98 toward the governor, as illustrated in Fig. 17, it still will not operate the automatic valve until the engine load is released sufficiently to develop an increased vacuum, or suction, within the intake manifold. When this occurs the automatic valve will be shifted from the position, as illustrated in Fig. 17, to the position, as illustrated in Fig. 18. When so shifted the port 124 is placed in registry with the pipe 125 that connects the vacuum chest 67 with the cylinder 35. The piston 34 is then actuated into the position, as illustrated in Fig. 18, and simultaneously therewith moves the piston rod 38 and shifts the driving gears of the transmission case into second, or intermediate driving position.

The piston, piston rod, valve and locking block assembly are diagrammatically laid out in Figs. 16 to 19 inclusive. In Fig. 16 the diagrammatical layout illustrates the assembly for placing the gears in neutral gear driving position. In Fig. 17 the diagrammatical layout illustrates the entire assembly in position for placing the driving gears in low driving gear position.

In Fig. 18 the diagrammatical layout illustrates the associated assembly in position for placing the gears in second gear driving position. And in Fig. 19 the diagrammatical layout illustrates the assembly in position for placing the gears in position for high gear driving position.

A locking block 126 is disposed between the piston rods 37 and 38. A locking notch is disposed within the side wall of each of the piston rods 37 and 38. A locking plunger 127 is reciprocably disposed within the locking block 126 and the oppositely disposed ends of the locking plunger are rounded, or curved to adapt the same for precisely engaging within the locking notches 128 and 129, of the respective piston rods. The plunger is so arranged that it can be fully entered into but one of the receiving notches at a time. This prevents the shifting of the piston rods 37 and 38 and the related pistons associated therewith, excepting one at a time.

The piston rod 38, as illustrated in Fig. 17, when locked by the locking plunger 127 precisely positions the piston over the port 36 disposed centrally of the side wall of the cylinder 35 and in doing so permits the piston rod 37 to have freedom of movement.

In the automatic shifting of the automatic valve 66 from low to second gear driving position, the piston rod 38 that automatically shifts the gears in the transmission case from low driving position to second driving position is locked through the action of the locking plunger 127, and in the shifting of the automatic valve 66 automatically the exhaust port 130 that exhausts to the atmosphere is placed in registry with the pipe line 87 and 89 and through the port 88 and releases the suction within the cylinder 32, simultaneously with the placing of the automatic valve in position to exhaust from the cylinder 32.

A suction is created through the pipe 131 by the same being placed in registry with the port 132 of the automatic valve 66 being placed in registry with the vacuum chest 67 and this places the piston 31 in position to place the transmission gears into neutral driving position and in condition for being shifted from low to second gear driving position. Simultaneously therewith the suction is created within the cylinder 35 to move the piston and piston rod 38 in position for shifting the transmission gears from neutral driving position into second gear driving position. Shifting from second gear driving position to high gear driving position is accomplished automatically as the speed of the motor vehicle increases and the driving load upon the engine decreases until the automatic mechanically operated governor 101 and the piston rod 94 shifts the automatic valve into the position as illustrated in Fig. 19.

In the automatic shifting of the transmission gear from second gear driving position to high gear driving position suction is created within the cylinder 35 by the automatic valve 66 being moved longitudinally until the port 133 is placed in registry with the pipe 134 to permit the suction to be developed through the piping and valve assembly from the vacuum chest 67 to the cylinder 35. This moves the piston 34 to the oppositely disposed end of the cylinder 35 and shifts the driving gear from second driving position to high gear driving position through the longitudinal movement of the piston rod 38, simultaneouly with the port 133 of the automatic valve being placed in registry with the pipe leading to the cylinder 35. The pipe connection 135 places the exhaust port 136 of the automatic valve in registry with the pipe connection 134.

In placing the gear shift of the transmission in second gear driving position the assembly takes the position, as illustrated in Fig. 18. In doing so the suction created through the pipe 87 leading from the cylinder 32 through the manually manipulated valve port 88 and the pipe 89 ceases. This is caused by the movement of the automatic valve 66 placing the port 88 out of registry with the port 90 and into registry with the exhaust port 130 that exhausts to the atmosphere. In doing so the piston rods 37 and the piston 31 are returned to neutral position with the piston 31 being placed over the exhaust port 36. The receiving notch 128 is then so positioned as to permit the locking plunger 127 engaging the locking notch 128. This permits the shifting of the piston rod 38 and the piston 34 because of the suction created within the cylinder 35.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination of a transmission and an engine, a pair of valves, one of said pair of valves being adapted for being manually shifted to place the transmission gears into neutral, into low and into reverse driving position when shifted manually, the other of said valves being adapted for being automatically shifted by a combination of a vacuum manipulating device and by a mechanical governing device, and means for automatically throttling the engine when the transmission gears are automatically shifted.

2. In a device of the class described, in combination with the transmission and the engine of a motor vehicle, comprising manually settable means for shifting the gears of the transmission into a neutral and into a reverse driving position and automatic means for making the other essential shifts of the transmission gears, said automatic means being comprised of a valve, vacuum means for actuating the valve and mechanical governing means adapted for coacting with the vacuum means so that the selected gear ratios are controlled by the speed of the vehicle and the labor of the engine.

3. In a device of the class described, in combination with the transmission and the engine of a motor vehicle, comprised of valves, manually settable means for actuating one of the gears and for selecting the transmission gears for neutral and for reverse driving position, the other of said valves being adapted for being actuated by a vacuum means and a mechanical controlled means, and for automatically actuating the transmission gears into higher driving ratios and into lower driving ratios and means for throttling the engine during the automatic shifting of the gears.

4. In a device of the class described, the combination of a pair of valves, one of said valves being adapted for being manually manipulated, and the other of the valves being adapted for being automatically manipulated, the automatic valve being adapted for being actuated by the combined action of a mechanical governor and the suction created within the inlet manifold of the internal combustion engine.

5. In a device of the class described, the combination of a pair of settable valves, one of which is adapted for being manually manipulated, the other of the valves being adapted for being automatically manipulated through the combined action of a mechanical governor that is actuated off of the power shaft of the motor vehicle and a piston and cylinder that is operated off of the vacuum line of the motor vehicle.

6. An automatic transmission gear shifting device comprised of a mechanical governor, means for driving the mechanical governor, a shaft adapted for having longitudinal movement imparted thereto by the governor, a valve shifting arm disposed in registry alignment with the shaft of the governor, means for hingedly connecting the arm with the governing shaft, means for normally maintaining the shaft extended relative to the governor, a slide valve, a stem outwardly extending from the slide valve, reacting elements disposed between the valve shifter arm and the valve stem, a cylinder, a piston reciprocably disposed within the cylinder, and means for connecting the piston with the valve shifter arm and means for creating a suction within the cylinder and for actuating the piston thereby.

7. An automatic gear shifting device comprised of a mechanical governor and a cylinder and piston and piston rod adapted to coact together in the actuating of a valve arm, neither of which when acting alone are adapted to actuate the arm but the combined force of which are adapted to actuate the arm.

8. An automatic gear shifting device, in combination with the transmission of an automotive vehicle, comprising a power driven mechanical governor, means associated with the governor for maintaining the actuating shaft of the governor normally extended, and means in combination with the piston disposed within the cylinder for jointly actuating a slide valve for indirectly actuating a gear shift of the transmission of the motor vehicle.

9. In a device of the class described, in combination with the transmission and the vacuum line of an automotive vehicle, comprising a mechanical governor and a cylinder communicating with the vacuum line of the motor vehicle, a piston disposed within the cylinder and the governor and the piston adapted for jointly actuating a slide valve for progressing the same longitudinally in either direction.

10. A device for the automatic shifting of the transmission gears of an automotive vehicle, comprising valves, a mechanical governor, means for imparting rotation to the governor, means disposed between the governor and one of the valves, and means coacting with the mechanical governor and adapted for being actuated through the medium of suction for actuating a slide valve of one of the valves.

11. A device for the automatic shifting of the transmission gears of an automotive vehicle, comprising a power driven mechanical governor, means associated with the mechanical governor for imparting longitudinal movement to a shaft, and a cylinder, means for intercommunicating the cylinder with a suction head, a piston and piston rod assembly associated with the cylinder and adapted for coacting with the shaft of the mechanical governor for imparting a swinging movement, when acting together, to a valve shifter arm.

12. In a device of the class described, the combination of a pair of valve bodies, a pair of slide valves disposed with in the valve bodies, one of said slide valves adapted for being manually manipulated and when manipulated for actuating a transmission gear into neutral a low, or a reverse driving position depending upon the position the manually operated slide valve is placed in when manually manipulated, a mechanical governor and a cylinder and piston and piston rod assembly adapted for actuating the other of the slide valves, each of said slide valves when manipulated being adapted for placing ports in registry with communicating passageways that will communicate a suction force to cylinders having pistons associated therewith and a mechanical operated governor that coacts with one of the cylinder and piston and piston rod assemblies for the automatic shifting of the transmission gears when acting together.

13. In a device of the class described, the combination of valve bodies, slide valves associated with the valve bodies, manually manipulative means for positioning one of the slide valves and for energizing manipulative means for shifting the gears of the transmission into neutral, low and reverse position when manually manipulated, a power driven mechanical governor adapted for being driven and to reflect the speed of the motor vehicle when driven and adapted for actuating the other of the slide valves in conjunction with an actuator that reflects the load of the engine of the motor car.

14. In a device of the class described, in combination with an internal combustion engine and the transmission of a motor car, a mechanically operated power driven governor, a cylinder, piston and piston rod assembly adapted to the internal combustion engine and the piston adapted for being actuated from the vacuum developed by the engine and a valve, and the governor and the piston and piston rod assembly adapted when coacting together to actuate the valve.

15. In a device of the class described, in combination with an internal combustion engine and the transmission of a motor vehicle, comprising a governor and a piston and piston rod reciprocably disposed within a cylinder and a slide valve and the governor and piston and piston rod adapted for actuating the slide valve when coacting together.

KENNETH M. HAINSWORTH.